June 4, 1929.  W. F. MANNING  1,716,235
AMUSEMENT APPARATUS
Filed July 12, 1928   3 Sheets-Sheet 2

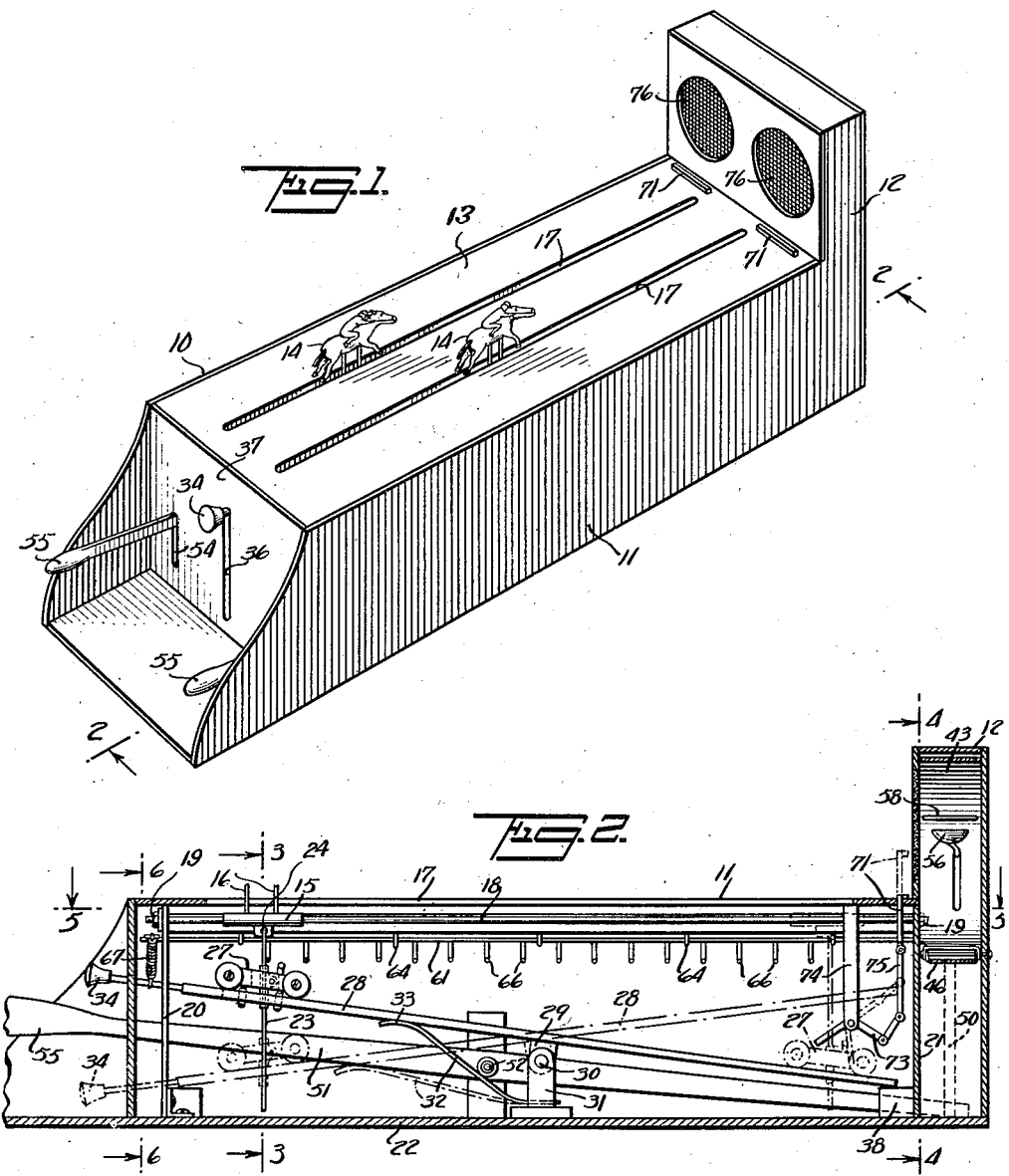

WITNESSES
INVENTOR
William F. Manning
BY
ATTORNEY

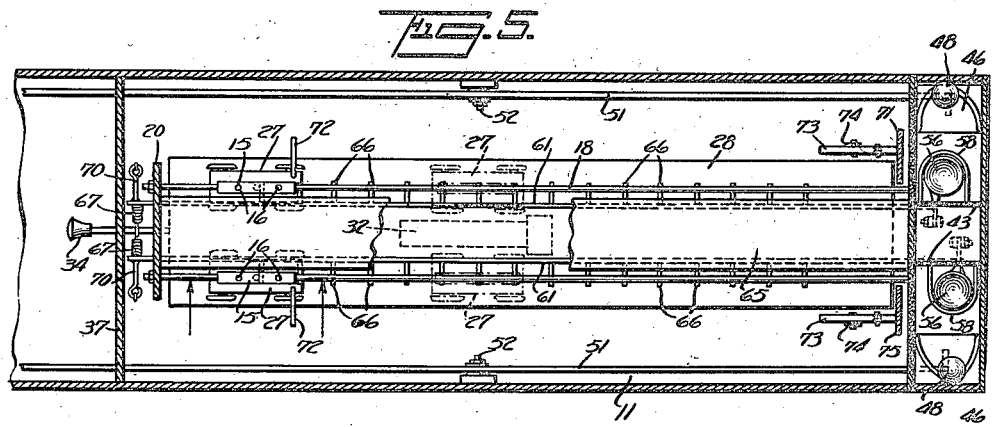
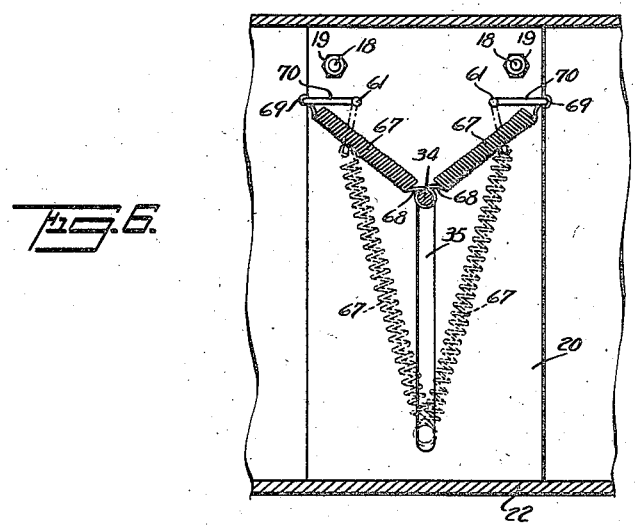
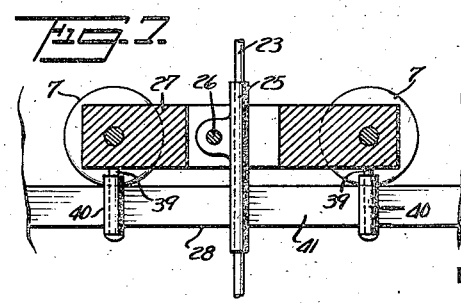

Patented June 4, 1929.  1,716,235

UNITED STATES PATENT OFFICE.

WILLIAM F. MANNING, OF NEW YORK, N. Y.

AMUSEMENT APPARATUS.

Application filed July 12, 1928. Serial No. 292,174.

This invention relates to an amusement apparatus designed to simulate a race course or track, which is traversed by suitable objects, which may be in the form of animals, such as horses, or other objects such as vehicles, the movements of which are brought about by persons who will compete against each other, to the end that one or the other may win the race by exercising greater skill than the other person or persons.

The principal object of the invention is the provision of an apparatus of the indicated character which will embody novel features of construction and operation The nature of the invention and its distinguishing features and advantages will appear when the following specification is read in connection with the accompanying drawing, in which Figure 1 is a perspective view of the apparatus embodying the features of the present invention.

Fig. 2 is a longitudinal sectional view taken on the line 2—2 of Fig. 1.

Fig. 5 is a sectional view taken on the line 5—5 of Fig. 2.

Fig. 6 is a sectional view taken on the line 6—6 of Fig. 2.

Fig. 7 is a sectional view illustrating certain details.

Figure 3:
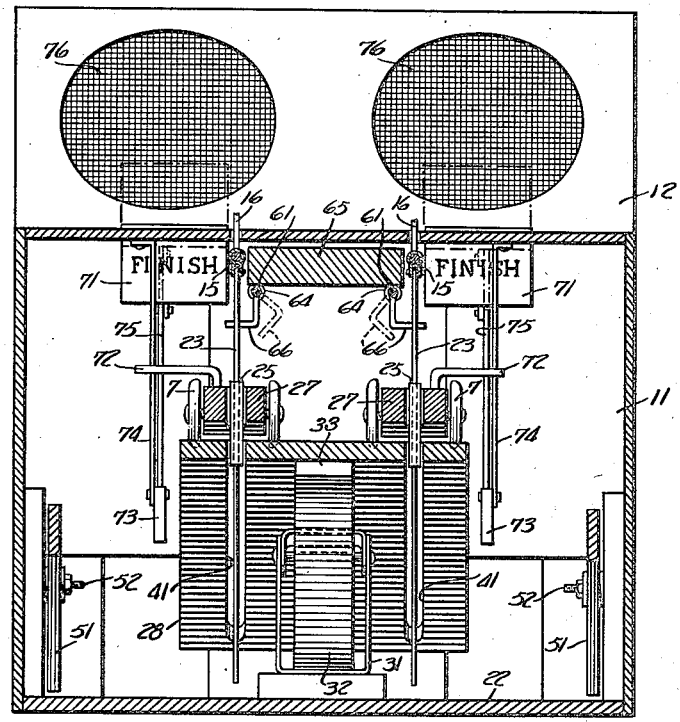
Fig. 3 is a transverse sectional view taken on the line 3—3 of Fig. 2, the same being shown on an enlarged scale.

Referring now more particularly to the drawings, it will be apparent that the apparatus will include a housing or casing 10 of suitable construction, and made from any preferred materials. The housing or casing 10 consists of a section 11 and a section 12 at one end of the section 11. The top surface 13 of the section 11 represents a race course or track, which is traversed by suitable objects in the form of animals such as horses, or other objects such as vehicles. It is to be understood that any preferred number of objects may be provided, one or more of which may be under the control of each person. In the present instance there is shown but two objects in the form of horses with riders designated 14. Each horse 14 is mounted in any suitable manner on a trolley or slide 15. In the present instance the trolley or slide 15 is of tubular construction and is provided with upstanding members 16 secured to the horse 14, the said members extending through a longitudinal slot 17 in the top 13. The trolley or slide 15 is arranged for movement on a guide rod 18 arranged directly below the slot 17, the opposite ends of said rod 18 respectively being secured as at 19 to uprights 20 and 21 secured to the base 22 of the casing 10.

In order to impart movement to each of the trolleys 15 there is provided separate means which operates in conjunction with each trolley 15. The said means includes a rod 23, the upper end of which is pivotally connected as at 24 with the trolley 15. The said rod 23 extends through a tubular member 25 pivotally connected as at 26 with a traveler 27 having rollers 7, there being a pair of such rollers at each end of the traveler 27. Each of the travelers 27 serves as a weight. Each of the travelers 27 is guided for movement in opposite directions in a straight path, and this is accomplished by the provision of a runway or platform 28. The runway or platform 28 is arranged within the section 11, extends longitudinally thereof, and is mounted for tilting or rocking movement. This is accomplished by providing the under side of the runway or platform 28 with spaced lugs 29 which receive a pivot 30 carried by a bearing 31 secured to the base 22. The runway or platform 28 is pivoted at a substantially central point in its length. The runway or platform 28 is under the influence of a flat leaf spring 32 one end of which is in contact with the under side of the runway or platform 28, as at 33, and the opposite end of said spring is rigidly secured to the bearing 31. The spring 32 has a normal tendency to bring the runway or platform 28 to a position in which it will incline downwardly toward the section 12 of the casing 10, as shown in full lines in Fig. 2. One end of the runway or platform 28 is provided with a handle 34 which extends through a slot 35 in the upright 20, and a slot 36 in the end wall 37 of the casing section 11. The opposite end of the runway or platform 28 comes in contact with a block 38 secured to the base 22 which limits the downward movement of the related end of the runway or platform 28. Each of the travelers 27 is provided with a pair of pins 39 on the under side thereof. Each pin has arranged thereon a tubular member 40 which is disposed in a longitudinal slot 41 in the runway or platform 28. The tubular member 40 is freely rotatable on its pin 39, and rolls in contact with the walls of its slot 41 to reduce friction to the minimum. Each of the slots 41 extends parallel with the related guide rods 18. It will now be understood that when each traveler 27 is allowed to run by gravity down the runway or platform 28 movement will be imparted to its related trolley 15 through the intervention of the rod 23. It will also be apparent that the trolley 15 will be under the influence of the traveler 27 in spite of the fact that it travels from a relatively high elevation, the starting point of the traveler, to a relatively low elevation when it arrives at the finishing point of its travel as indicated in dot and dash lines in Fig. 2; it being apparent that the tubular member 25 has relative up and down sliding movement on its rod 23, as the traveler rolls back and forth on the runway or platform 28.

Figure 4:
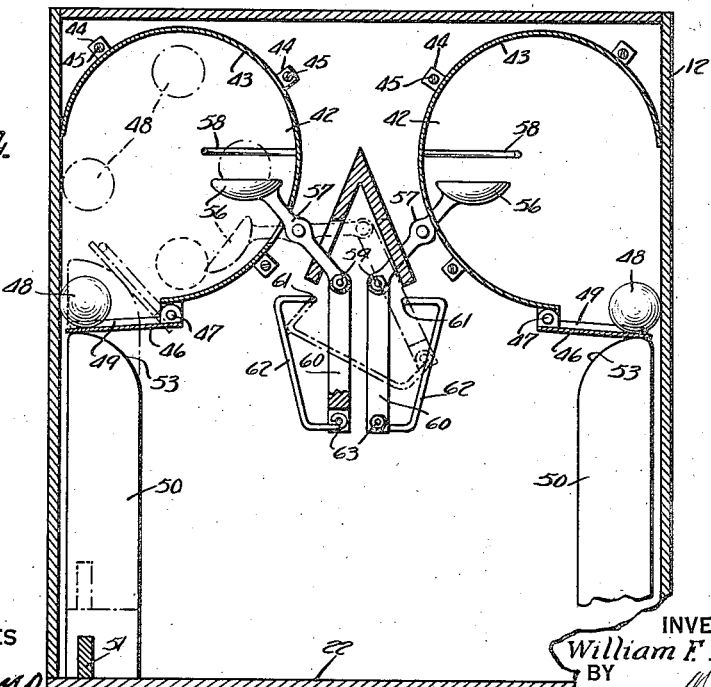
Fig. 4 is a transverse sectional view taken on the line 4—4 of Fig. 2, on an enlarged scale.

In order to govern the movement of each traveler 27, and its related trolley 15 there is provided separate means designed and adapted to be manipulated by a person in conjunction with each traveler 27 and its trolley 15. The said means includes a chamber 42 in the casing section 12, which chamber 42 is defined by a flat strip of metal bent substantially in oval shape, and constitutes a race 43. The race 43 is rigidly secured in any suitable manner, the same being provided with lugs 44 which accommodate screws 45 screwed into the section 12. A member 46 constituting a projector is hingedly connected as at 47 with the lower end of the race 43. The member 46 is operated in conjunction with a ball 48 which serves as a weight. The upper surface of the member 46 is provided with means for causing the ball to come to a certain position on the member 46, there being provided curved pieces of wire 49, in the present instance. The member 46 is actuated by an up-throw member 50 on one end of a lever 51 including a central pivot 52. The upper end of the member 50 is curved or rounded as at 53 so as to readily cooperate with the member 46. The end of the lever 51 opposite that having the member 50 extends through a slot 54 in the end wall 37, and is provided with a handle 55. It is to be understood that any other suitable means may be employed for actuating the member 46. It will be apparent that when the handle 55 is manipulated by exerting a downward blow thereon, the member 50 will exert a quick upward thrust on the member 46 causing the ball 48 to travel around the race 43. Extending within the chamber 42 is a dished member or saucer 56 on one end of a rocker 57. A ring 58 is attached to the race 43 and is disposed directly above the saucer 56 when the latter is in its normal position, as shown in full lines in Fig. 4. The saucer 56 is adapted to receive the ball 48 after passing through the ring 58, it being understood that a certain amount of skill and accuracy is required in order to pitch the ball into the saucer 56 through said ring 58. The rocker 57 has pivotally connected therewith as at 59 a weighted link 60. The link 60 is connected with a trip rod 61 by a member 62 rigidly connected at one end with the rod 61, and having its opposite end pivotally connected as at 63 with the link 60. The trip rod 61 is supported for turning movement by the uprights 20 and 21, and also by eyes 64 attached to the underside of a support 65 having the opposite ends respectively secured to the uprights 20 and 21. The rod 61 is provided with a plurality of substantially L-shaped obstacles 66 which are spaced equi-distantly, and will be disposed normally in the path of travel of the rod 23 of the related trolley 15. The trip rod 61 is disposed parallel to the path of travel of the said rod 23, and each of the obstacles 66 is encountered by the said rod 23.

It will now be apparent that when each trolley 15 is in its starting position as shown in Fig. 2, with the related traveler 27 poised upon the high end of the runway or platform 28, that the traveler 15 may be released for step by step movement each time the trip rod 61 is turned by reason of the ball 48 being brought into the saucer 56. Each time the ball 48 is brought into the saucer 56, movement will be imparted to the rod 61 through the intervention of the rocker 57 and weighted link 60, thereby causing disengagement of the first obstacle 66 with the rod 23. As a consequence the traveler 27 will be allowed to run by gravity down the runway 28 carrying with it its trolley 51 until the rod 23 is encountered by the next obstacle 66 which will be brought into obstructing position, as soon as the ball 48 rolls out of the saucer 56, it being understood that the weighted link 60 serves for the purpose of bringing about this result and also for the purpose of bringing the saucer 56 to its normal position. This operation is continual by the repeated operation or manipulation of the handle 55 on the related lever 51, until the horse 14 is brought to the finishing point.

In order to return the travelers 27 and their trolleys 15 to the normal or starting positions, and to move the trip rods 61 so that the obstacles 66 will be disposed out of the path of travel of the rods 23, when the runway or platform 28 is moved to the position indicated in dot and dash lines in Fig. 2, there is provided means in the form of springs 67. One end of each of the springs is connected with the handle 34 as at 68, and the opposite ends thereof are connected respectively as at 69 with lateral members 70 respectively on the trip rods 61, as shown most clearly in Fig. 6. It will now be apparent that when the handle 34 is pressed downwardly, the runway or platform 28 will be reversely inclined, and at the same time the springs 67 will exert a pulling force on the members 70 causing the trip rods 61 to turn, thereby bringing the obstacles 66 of each trip rod 61 out of the path of travel of the related rods 23. The travelers 27 will then be allowed to roll down on the runway or platform 28 carrying with them their trolleys 15. When the handle 34 is released, the springs 67 and spring 33 come into play and reverse the inclination of the runway or platform 28, while the trip rods 61 are moved by the weighted links 60 to the positions in which the obstacles 66 will be in the path of travel of the rods 23, the latter engaging the first two obstacles 66 respectively of the rods 61. It will be understood that as the runway or platform is brought to the normally inclined position, the tubular member 25 of each traveler 27 will slide on its related rod 23.

In order to indicate the winner of the race there is provided an indicating or signal member 71 which is operated by the movement of each of the travelers 27 just prior to coming to the finishing position. This is accomplished by providing each traveler 27 with an arm 72 which engages a bell crank lever 73 carried by a bracket 74, the bell crank lever being connected with the related member 71 by linkage 75. The provision is such that when the arm 72 encounters the lever 73 movement will be imparted to the linkage and therefore to the member 71 elevating the latter to an exposed position. Each member 71 may have appropriate indicia such as the word "finish", or any other word or legend. When the travelers 27 are being returned to their starting positions, the particular member 71 automatically returns to a position inside of the casing section 11. Each member 71 is limited in its downward movement by the related lever 73 which will be properly weighted to counterbalance the weight of the linkage and related member 71. It is to be understood that any other suitable type of indicating means may be employed. In order that each of the balls 48 may be observed while it is being projected or propelled around in the chamber 42, the front wall of the casing section 12 may be provided with a glass panel or screen. A screen 76 is provided for each of the chambers 42 in the present instance, each screen 76 being attached to the front wall of the casing section 12.

It is to be understood that an apparatus may be constructed with any preferred number of objects 14 with the necessary operating means for each one of the objects 14; and that if desired two saucers 56 may be arranged in each compartment and each chamber 42 with means connecting the same to govern the movement of two objects 14 with one ball 48.

It is to be understood that the invention is not restricted to the precise arrangement of parts shown and described, as details of construction may be modified and rearranged without departing from the spirit of the invention, the scope of which is limited only by the terms of the appended claims.

I claim:

1. In an amusement apparatus, a raceway, object carrying trolleys having guided movement with respect to said race-way, a depending rod on each trolley, a runway mounted for movement to inclined positions, travelers having forward and rearward guided movement on said runway, one traveler being connected with each rod by means which allows the traveler to move up and down with respect to said rod, and which causes movement of the trolley in response to the movement of the traveler through the intervention of said rod, and actuable means which cooperates with each rod to control the traveler so that it will move step by step.

2. In an amusement apparatus, a raceway, object carrying trolleys having guided movement with respect to said race-way, a depending rod on each trolley, a runway mounted for movement to inclined positions, travelers having forward and rearward guided movement on said runway, one traveler being connected with each rod by means which allows the traveler to move up and down with respect to said rod, and which causes movement of the trolley in response to the movement of the traveler through the intervention of said rod, and ball actuated means which coacts with each rod for the purpose of controlling the forward movement of its traveler and trolley.

3. In an amusement apparatus, a chamber having a ball-race therein, a rocker having a ball receptacle disposed in said chamber adjacent said ball-race, a ball, ball propelling means to propel said ball around said ball-race into said receptacle for the purpose of actuating said rocker, and a holding and releasing means connected with and actuated by said rocker.

4. In an amusement apparatus, a runway, means mounting said runway for movement to inclined positions, travelers having guided movement on said runway, each of said travelers being movable under its own weight, yieldable means having a normal tendency to hold said runway in one of its inclined positions to allow the travelers to move in a forward direction, and means to move said runway to its other inclined position, to allow said travelers to move in a rearward direction, so as to return to their original positions.

5. In an amusement apparatus, a runway, means mounting said runway for movement to inclined positions, travelers having guided movement on said runway, each of said travelers being movable under its own weight, yieldable means having a normal tendency to hold said runway in one of its inclined positions to allow the travelers to move in a forward direction, means to move said runway to its other inclined position, to allow said travelers to move in a rearward direction, so as to return to their original positions, and means operable in conjunction with each of said travelers to control it so that it moves forwardly step by step.

6. In an amusement apparatus, a runway means mounting said runway for movement to inclined positions, travelers having guided movement on said runway, each of said travelers being movable under its own weight, yieldable means having a normal tendency to hold said runway in one of its inclined positions to allow the travelers to move in a forward direction, means to move said runway to its other inclined position, to allow said travelers to move in a rearward direction, so as to return to their original positions, and an object-carrier associated with each traveler, said object-carrier having guided movement and movable in response to the movement of its traveler by a rod pivotally connected with the object-carrier and slidably connected with said traveler.

7. In an amusement apparatus, a runway, means mounting said runway for movement to inclined positions, travelers having guided movement on said runway, each of said travelers being movable under its own weight, yieldable means having a normal tendency to hold said runway in one of its inclined positions to allow the travelers to move in a forward direction, means to move said runway to its other inclined position, to allow said travelers to move in a rearward direction, so as to return to their original positions, an object-carrier associated with each traveler, said object-carrier having guided movement and movable in response to the movement of its traveler by a rod pivotally connected with the object-carrier and slidably connected with said traveler, and means operable in conjunction with each rod, for the purpose of controlling the object-carrier and traveler so that they move step by step.

8. In an amusement apparatus, a runway, means mounting said runway for movement to inclined positions, travelers having guided movement on said runway, each of said travelers being movable under its own weight, yieldable means having a normal tendency to hold said runway in one of its inclined positions to allow the travelers to move in a forward direction, means to move said runway to its other inclined position, to allow said travelers to move in a rearward direction, so as to return to their original positions, and indicating means actuated by each traveler as it moves into a predetermined position.

9. In an amusement apparatus, a raceway, object carrying trolleys having guided movement with respect to said race-way, a depending rod on each trolley, a runway mounted for movement to inclined positions, travelers having forward and rearward guided movement on said runway, one traveler being connected with each rod by means which allows the traveler to move up and down with respect to said rod, and which causes movement of the trolley in response to the movement of the traveler through the intervention of said rod, actuable means which cooperates with each rod to control the traveler so that it will move step by step, and means operable to change the position of said runway and also to actuate said last mentioned means, to allow the travelers to move rearwardly on the runway to bring their trolleys to starting positions.

10. In an amusement apparatus, a runway, means mounting said runway for movement to inclined positions, travelers having guided movement on said runway, each of said travelers being movable under its own weight, yieldable means having a normal tendency to hold said runway in one of its inclined positions to allow the travelers to move in a forward direction, means to move said runway to its other inclined position, to allow said travelers to move in a rearward direction, so as to return to their original positions, actuable means to control each traveler so that it will move step by step in a forward direction, and indicating means actuated by each traveler as it moves into a predetermined position.

11. In an amusement apparatus, a raceway, objects having guided movement with respect to said raceway, travelers having guided movement, members which are connected respectively with said objects and which are acted on respectively by said travelers to move said objects, a rod mounted for rocking movement, said rod having a series of laterally projecting equally spaced obstacles normally disposed in the path of movement of each one of said members, and actuable means to rock said rod to move the obstacles into and out of the path of movement of the related member to control the related traveler to move step by step.

12. In an amusement apparatus, objects each having guided movement along a determined path, an inclined surface, guided means connected with each one of said objects and adapted to travel by gravity in contact with said inclined surface to move said object, and manipulatable means to control the travel of said first mentioned means so that said object will be moved thereby step by step.

Signed at Brooklyn, in the county of Kings and State of New York, this 10 day of July A. D. 1928.

WILLIAM F. MANNING.